(12) United States Patent
Vignal et al.

(10) Patent No.: US 8,312,819 B2
(45) Date of Patent: Nov. 20, 2012

(54) EXPANSION AND RETRACTION MECHANISMS FOR MOVEABLE TRAY TABLES

(75) Inventors: Pierre J Vignal, Winston-Salem, NC (US); Joseph Embry, Allen, TX (US); Alexander N. Pozzi, Winston-Salem, NC (US)

(73) Assignee: Weber Aircraft LLC, Gainesville, TX (US)

( * ) Notice: Subject to any disclaimer, the term of this patent is extended or adjusted under 35 U.S.C. 154(b) by 473 days.

(21) Appl. No.: 12/332,108

(22) Filed: Dec. 10, 2008

(65) Prior Publication Data

US 2009/0174234 A1 Jul. 9, 2009

Related U.S. Application Data

(60) Provisional application No. 61/005,994, filed on Dec. 10, 2007.

(51) Int. Cl.
*A47B 23/00* (2006.01)

(52) U.S. Cl. .................... 108/44; 108/143; 297/163

(58) Field of Classification Search .................... 108/42, 108/44, 134–135, 137, 139–140, 143, 147.19; 297/163, 173, 146; 296/37.16; 384/10, 17, 384/26, 32, 37, 42; 312/334.16, 334.36, 312/408, 410; 403/377

See application file for complete search history.

(56) References Cited

U.S. PATENT DOCUMENTS

| | | | | |
|---|---|---|---|---|
| 2,539,782 A * | 1/1951 | Kell | ............................. | 384/276 |
| 3,321,253 A * | 5/1967 | Everburg | ....................... | 384/23 |
| 3,586,394 A | 6/1971 | Hecksel | | |
| 3,738,725 A * | 6/1973 | Visser | ........................... | 312/246 |
| 4,141,586 A * | 2/1979 | Goldner et al. | .............. | 297/167 |
| 4,526,421 A | 7/1985 | Brennan et al. | | |
| 5,018,800 A * | 5/1991 | Cziptschirsch et al. | ... | 312/334.7 |
| 5,104,191 A * | 4/1992 | Tame | ...................... | 297/411.32 |
| 5,249,881 A * | 10/1993 | Austin et al. | ................. | 403/378 |
| 5,340,059 A | 8/1994 | Kanigowski | | |
| 5,413,414 A * | 5/1995 | Bauer | .......................... | 384/276 |
| 5,556,170 A * | 9/1996 | Lai et al. | .................... | 297/463.1 |
| 5,579,557 A * | 12/1996 | Boden | ............................ | 16/429 |
| 6,267,337 B1 * | 7/2001 | Kulhavy | ...................... | 248/161 |
| 6,484,450 B1 * | 11/2002 | Suprina et al. | ..................... | 52/8 |
| 6,619,733 B2 * | 9/2003 | Pearson | ....................... | 297/112 |
| 6,742,840 B2 | 6/2004 | Bentley | | |
| 6,805,403 B2 * | 10/2004 | Buch | ............................ | 297/146 |
| 6,976,597 B2 * | 12/2005 | Jahrling et al. | .............. | 211/175 |
| 7,621,593 B2 * | 11/2009 | Dickinson | .................... | 297/163 |
| 2003/0094843 A1 | 5/2003 | Jensen et al. | | |
| 2007/0283855 A1 * | 12/2007 | Pozzi | ............................ | 108/44 |

FOREIGN PATENT DOCUMENTS

| WO | WO-2003/064207 | 8/2003 |
|---|---|---|
| WO | WO-2009076453 A2 | 6/2009 |

OTHER PUBLICATIONS

International Search Report and Written Opinion in related Application Serial No. PCT/US2008/086253 mailed Jun. 12, 2009.

\* cited by examiner

*Primary Examiner* — Hanh V Tran

(74) *Attorney, Agent, or Firm* — Dean W. Russell; Kilpatrick Townsend & Stockton LLP

(57) ABSTRACT

Mechanisms designed to facilitate movement of tray tables or other platforms are addressed. Internal flexible sleeves provide more constant pressure on linearly-moving shafts associated with the tables, reducing or cancelling possible lateral misalignments of the shafts. Outer cases maintain the flexible sleeves in position, and positive stopping features may be employed to prevent extension or retraction of the shafts beyond desired amounts.

16 Claims, 11 Drawing Sheets

EXPANSION AND RETRACTION MECHANISMS FOR MOVEABLE TRAY TABLES

CROSS REFERENCE TO RELATED APPLICATION

This application claims priority to U.S. Provisional Patent Application Ser. No. 61/005,994 entitled Expansion and Retraction Mechanisms for Moveable Tray Tables filed on Dec. 10, 2007, the contents of which are incorporated herein by reference.

FIELD OF THE INVENTION

This invention relates to tray tables commonly used for food service and other purposes on-board passenger aircraft or other vehicles and more particularly, although not necessarily exclusively, to expansion and retraction mechanisms associated with such tables.

BACKGROUND OF THE INVENTION

Commonly-owned U.S. Pat. No. 6,742,840 to Bentley illustrates various tray table assemblies of the type frequently used on-board commercial aircraft. These tray tables, at times, are constructed so as to latch to the rear surfaces of back rests of seats forward of the users of the tables. Unlatching the tray tables permits their deployment into generally horizontal orientations for use as supporting platforms (for food trays or other items).

Figure 7A:
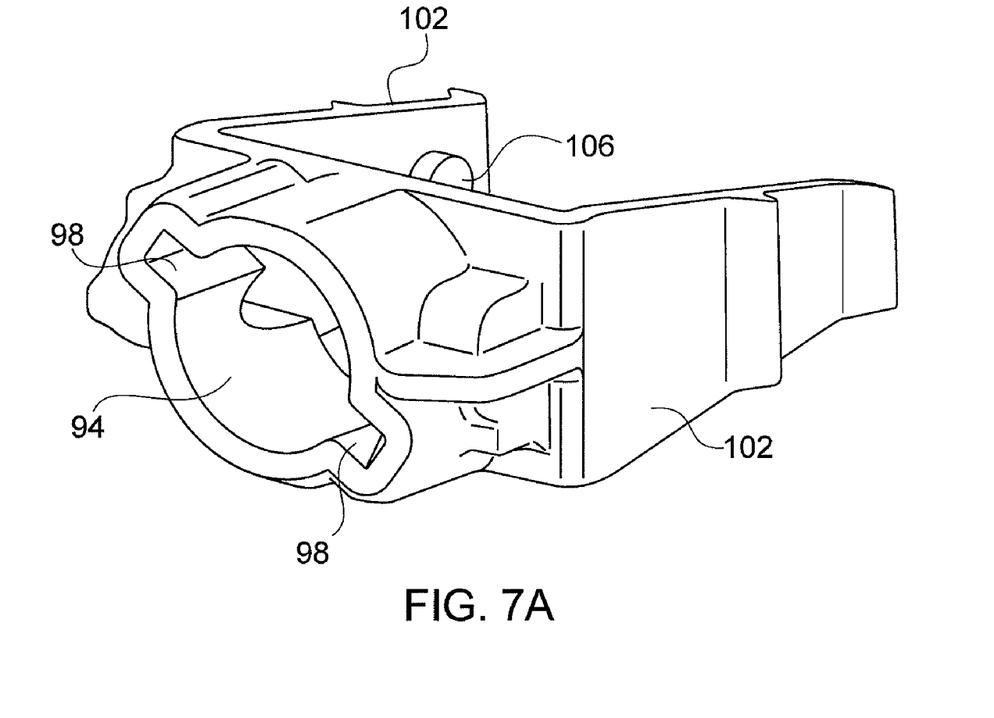
FIG. 7A-B illustrate a first end cap of the assembly of FIG. 1.
Figure 7B:
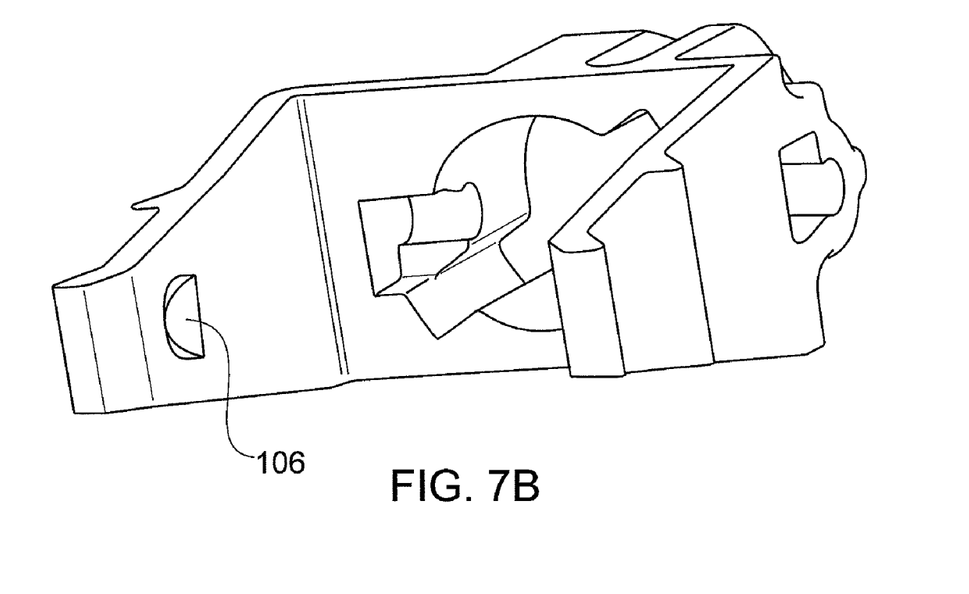

Also depicted in the Bentley patent are arms to which a tray table may be connected. These arms are attached to each side of the seat and are configured to pivot when the table is deployed or returned to its stowage position. FIGS. 7A and 7B of the Bentley patent, for example, detail locations of the arms when the tray table is stowed. FIGS. 7C and 7D, by contrast, illustrate positioning of the arms when the table is deployed.

U.S. Pat. No. 4,526,421 to Brennan, et al. details another tray table assembly for aircraft use. FIG. 7 of the Brennan patent shows one tray table, together with corresponding arms, deployed for use by the depicted passenger. A second tray table is stowed in contact with the rear surface of the back rest of the seat in which the passenger is seated.

Although food service tray tables for passenger vehicles usually are connected to or stowed in passenger seats (including sometimes in arm rests thereof), they need not always be so connected or stowed. U.S. Pat. No. 5,340,059 to Kanigowski describes tray tables instead extending from cabinet assemblies. These cabinet assemblies are attached to rear walls of aircraft cabin bulkheads, with each tray table apparently made of energy-absorbing material and additionally functioning to dissipate kinetic energy over its area when impacted by a passenger during a rapid deceleration of the aircraft.

Each of the tray tables of the Bentley, Brennan, and Kanigowski patents conceivably could be configured to move linearly when deployed. Depending upon the distance between rows of seats (seat pitch) in the vehicle cabin, the nominal distance between the deployed table and its user may be more or less than optimal. Permitting the tray table to move in the generally-horizontal plane toward or away from the passenger thus may be advantageous.

SUMMARY OF THE INVENTION

The present invention provides mechanisms or assemblies designed to facilitate movement of tray tables in the generally-horizontal plane. For tray tables connected to moveable shafts, the invention furnishes internal flexible sleeves intended to provide constant pressure on the shafts and reduce, if not cancel, possible misalignments. Outer casings function to maintain the flexible sleeves in position; they may assist in cancelling possible misalignments as well. Positive stopping features also may be employed to prevent extension or retraction of the shafts beyond preferred amounts.

Presently-preferred versions of the invention incorporate one or more flexible sleeves as part of the assemblies. Such sleeves may, if desired, resemble the Greek letter "π" in cross-section, with two outwardly-flared legs depending from a flanged base. The sleeves may, of course, have other cross-sectional shapes if appropriate or desired, however.

Beneficially, though, the flared, depending legs of a first sleeve are positioned in contact with, and so as to place pressure on, a (typically cylindrical) shaft. Legs of a second sleeve are positioned in contact with the shaft at locations opposite those of the legs of the first sleeve. As the shaft moves linearly, the opposing sleeves resist lateral movement of the shaft, effectively reducing the opportunity for lateral misalignment of the shaft. The flexibility of the sleeves effectively allows the shaft to self-align, reducing (if not cancelling) any manufacturing misalignment. After each shaft is inserted inside a corresponding sliding mechanism, the sleeves maintain lateral shaft positioning by applying constant pressure (e.g. spring effect) to the shaft. Linear ribs within the outer casings of the mechanisms may receive the flanged bases of the sleeves to limit their lateral movement.

Preferred stopping features of the invention include pins, ribs, and detents, although other stopping elements may be utilized instead. In embodiments using pins, ribs, and detents, when a shaft is fully extended, an associated pin is configured to be received by a detent in a first end cap of the outer casing. Reception of the pin by the detent prevents further extension of the shaft yet allows subsequent retraction thereof. By contrast, when the shaft is fully retracted, it may snap into (or otherwise be frictionally received by) ribs in a second end cap of the outer casing. This action prohibits further retraction of the shaft yet allows subsequent extension thereof.

In general, two parallel shafts, each positioned at least partially within an outer casing, will be used in connection with each tray table associated with the present invention. Typically, although not necessarily, the shafts and outer casings will extend within or along a table at or adjacent its opposing edges. One or more rods extending laterally between, and connected to, the shafts frequently may be employed.

It thus is an optional, non-exclusive object of the invention to provide assemblies facilitating movement of platforms.

It is an additional optional, non-exclusive object of the present invention to provide assemblies facilitating generally-horizontal movement of tray tables for deployment or stowage.

It is another optional, non-exclusive object of the present invention to provide assemblies enhancing lateral stability of tray tables by reducing, or cancelling, lateral misalignments thereof otherwise likely to occur during deployment for use.

It is a further optional, non-exclusive object of the present invention to provide assemblies including one or more flexible sleeves designed to pressure a shaft associated with a tray table.

It is, moreover, an optional, non-exclusive object of the present invention to provide assemblies in which opposing sleeves inhibit lateral motion of a shaft as it is extended and retracted linearly.

It is yet another optional, non-exclusive object of the present invention to provide assemblies in which further linear movement of shafts is prevented past certain defined stopping points.

It is also an optional, non-exclusive object of the present invention to provide assemblies in which pins, ribs, and detents may be employed to stop undesired linear movement of shafts.

Other objects, features, and advantages of the present invention will be apparent to those skilled in the appropriate field with reference to the remaining text and drawings of this application.

DETAILED DESCRIPTION

Figure 1:
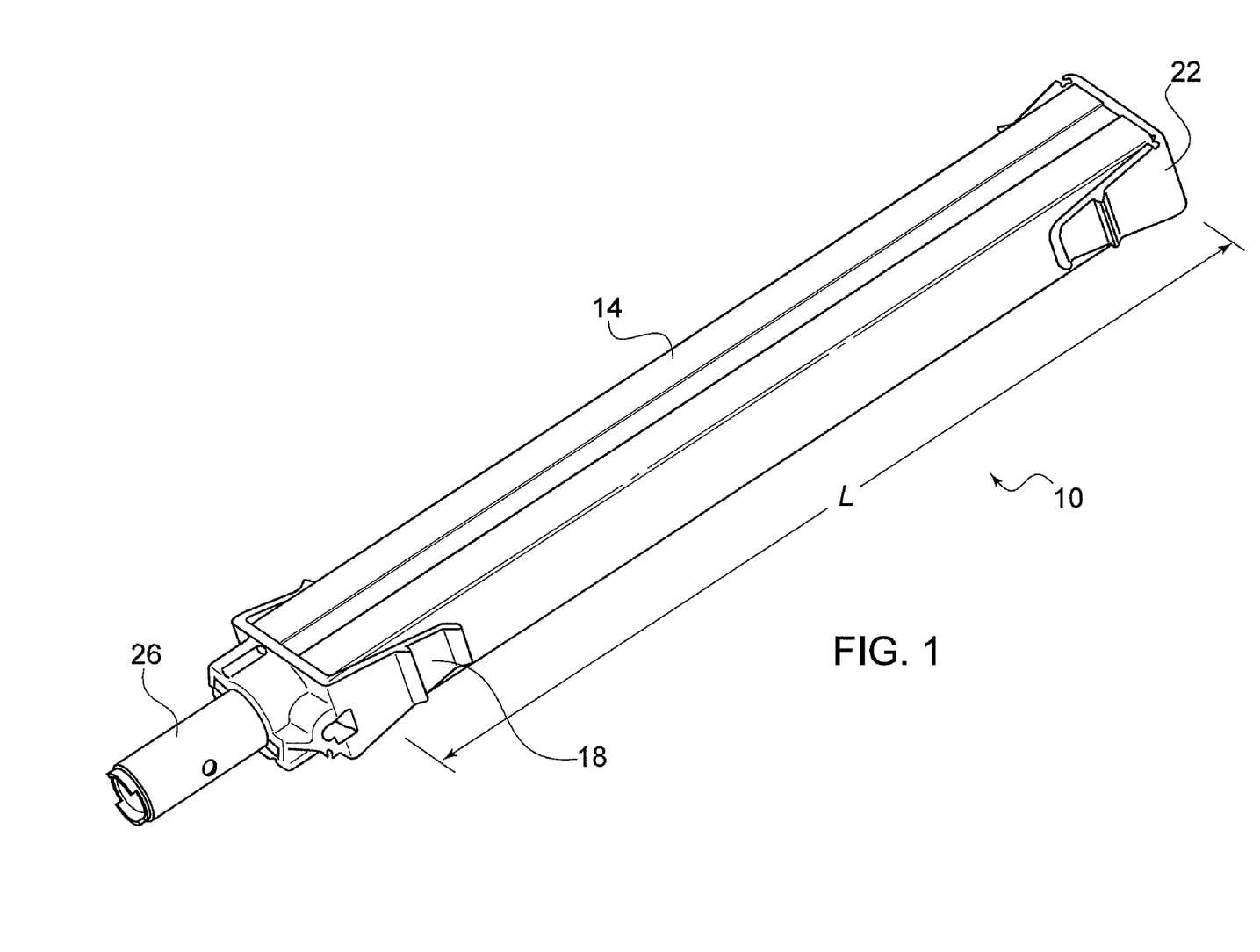
FIG. 1 illustrates an assembly of the present invention with a shaft retracted.
Figure 2:
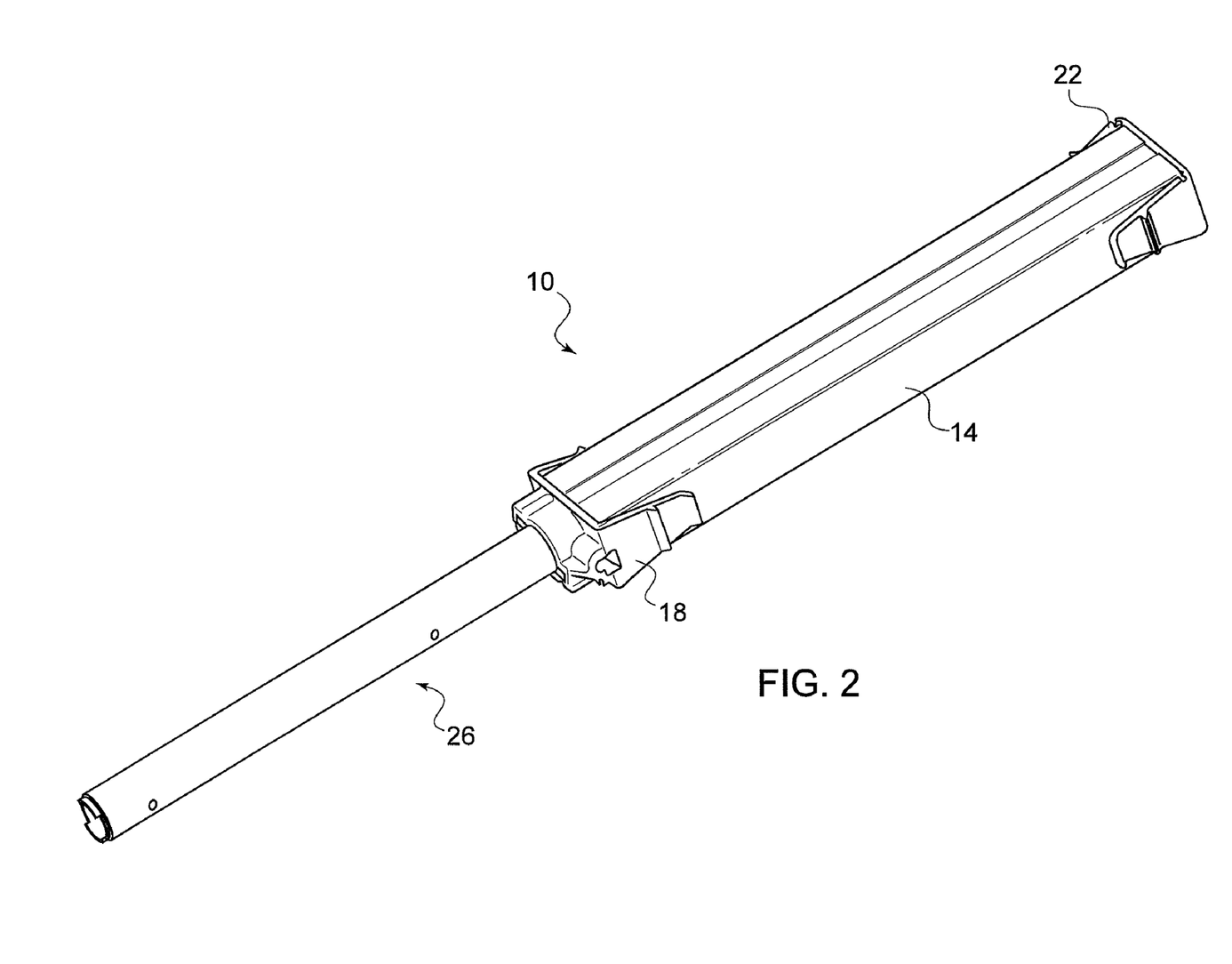
FIG. 2 illustrates the assembly of FIG. 1 with the shaft extended.

Detailed in FIGS. 1-2 is an exemplary assembly 10 of the present invention. Assembly 10 may include outer casing 14 together with first and second end caps 18 and 22, respectively. Also shown in FIGS. 1-2 is shaft 26, portions of which may be fitted within casing 14.

Shaft 26 may be similar or identical to those presently used with aircraft tray tables and preferably is made of metal or other relatively rigid material. Shaft 26 likewise preferably is generally cylindrical in shape. FIG. 2 illustrates that shaft 26 may be elongated; advantageously (although not necessarily), the length of shaft 26 exceeds the length L of casing 14.

Figure 3:
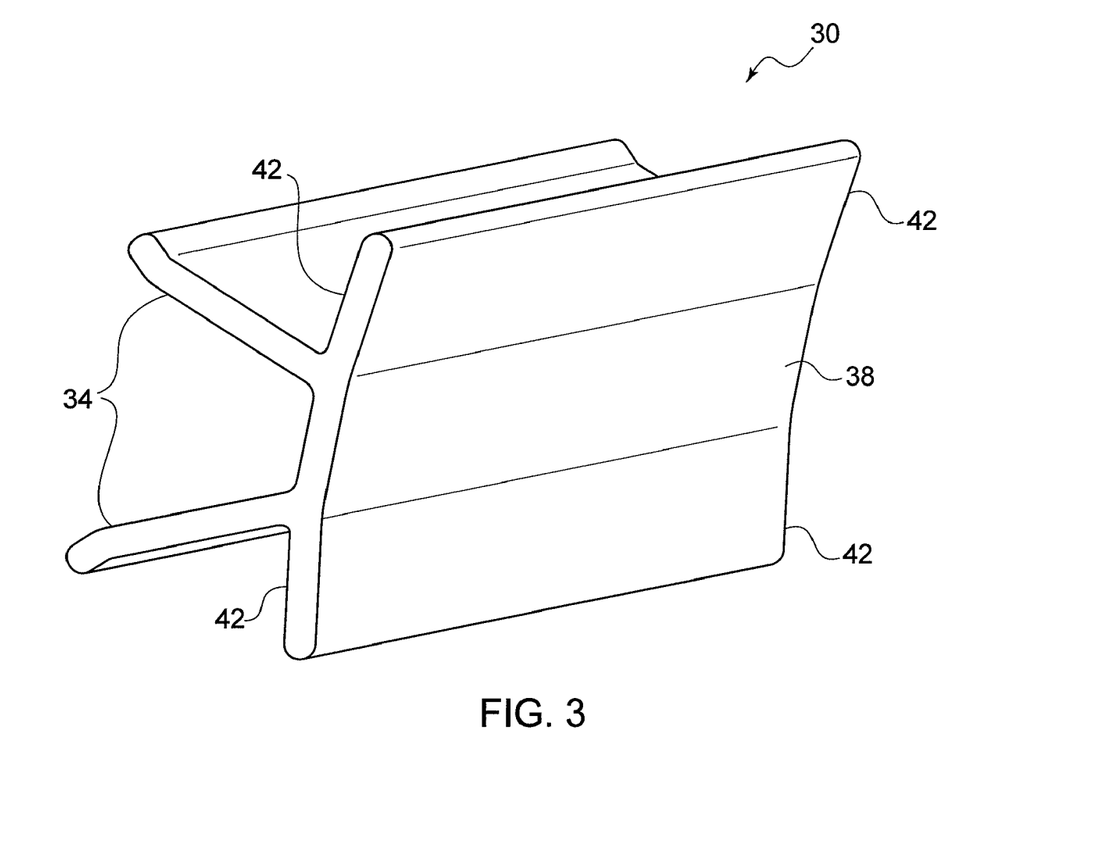
FIG. 3 illustrates a flexible sleeve of the assembly of FIG. 1.

FIG. 3 shows a version of sleeve 30 of assembly 10. Sleeve 30 preferably is made of flexible material, such as (but not limited to) plastic or natural or synthetic rubber, and of length less than L. Sleeve 30, furthermore, is configured for placement within casing 14 in contact with shaft 26.

In the embodiment of sleeve 30 depicted in FIG. 3, the sleeve 30 comprises legs 34 depending from base 38. Dependency locations of legs 34 effectively create flanges 42 for base 38. Moreover, legs 34 may flare outward from base 38; collectively, the configuration of legs 34 and base 38 causes sleeve to have cross-sectional shape resembling the Greek letter "π." Those skilled in the requisite art will, however, recognize that sleeve 30 may be shaped or configured other than as shown in FIG. 3.

Figure 4:
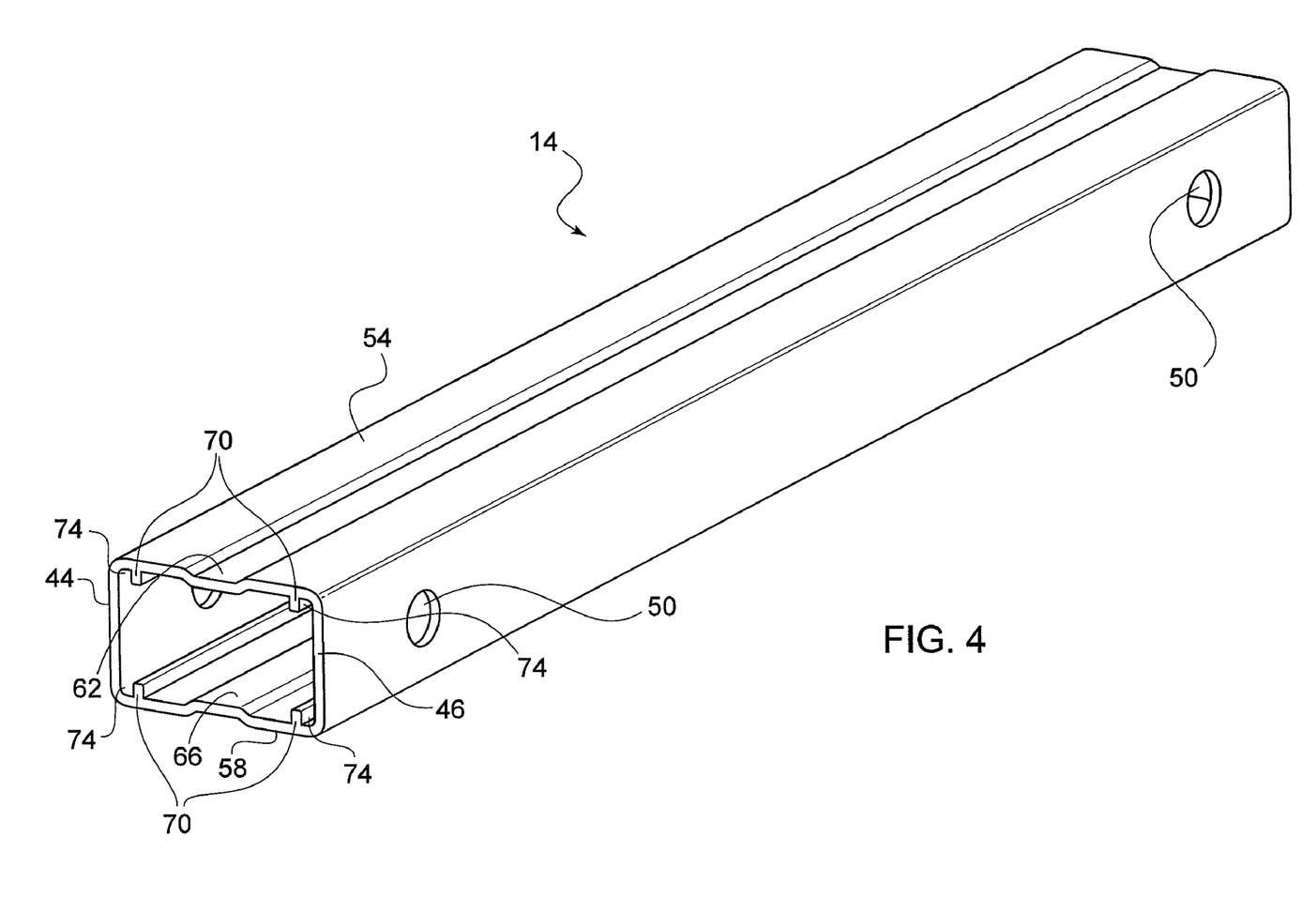
FIG. 4 illustrates an outer casing of the assembly of FIG. 1.

Illustrated in FIG. 4 is outer casing 14 of assembly 10. Casing 14 preferably, although not necessarily, has generally rectangular cross-section and sufficient width to accommodate shaft 26. Included in side walls 44 and 46 may be openings 50 for connection to end caps 18 and 22. Incorporated into top and bottom walls 54 and 58, respectively, may be centrally-located, inwardly-extending longitudinal protrusions 62 and 66, which may serve to decrease the distance shaft 26 may move up or down relative to casing 14. Longitudinally-extending ribs 70, together with side walls 44 and 46, define recesses 74 into which flanges 42 of bases 38 of sleeves 30 may be fitted.

Figure 6:
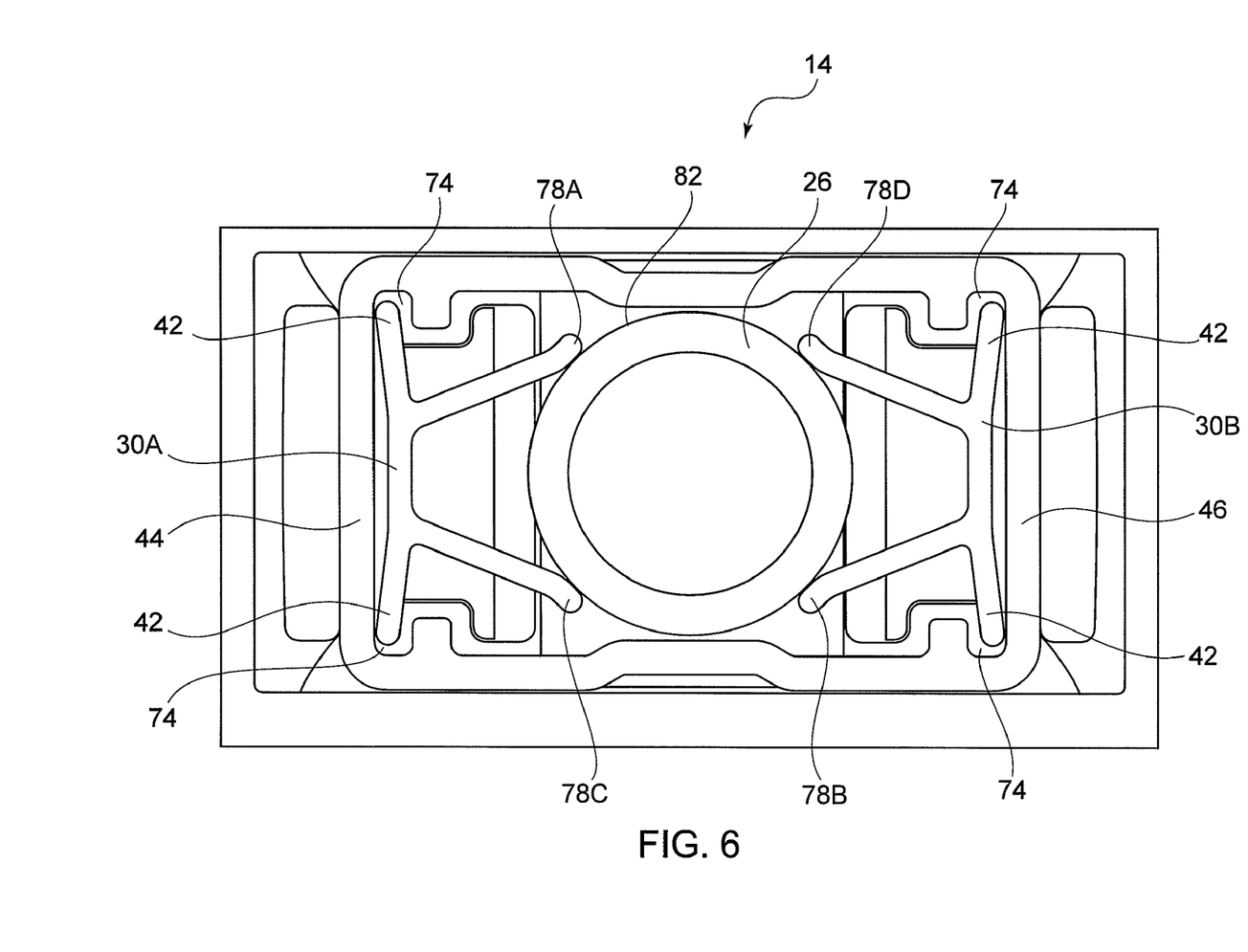
FIG. 6 illustrates a transverse cross-sectional view of the assembly of FIG. 1.

FIG. 6 details placement of sleeves 30 within casing 14. Shown in FIG. 6 are two sleeves 30, each positioned to an opposing side of centrally-located shaft 26. Sleeve 30A, for example, is placed between wall 44 and shaft 26, whereas sleeve 30B is placed between wall 46 and the shaft 26. In each instance, flanges 42 are received by recesses 74 to minimize lateral motion of the sleeves 30A-B.

As illustrated in FIG. 6, distal ends 78 of legs 34 bear against exterior 82 of shaft 26. Further, end 78A of sleeve 30A is positioned approximately one hundred eighty degrees about the circumference of exterior 82 from end 78B of sleeve 30B, and end 78C of sleeve 30A is separated from end 78D of sleeve 30B by approximately one hundred eighty degrees. Legs 78 thus place approximately constant laterally-opposed pressure on shaft 26, reducing ability of the shaft 26 to move laterally and become misaligned with respect to other portions of a tray table.

Figure 5A:
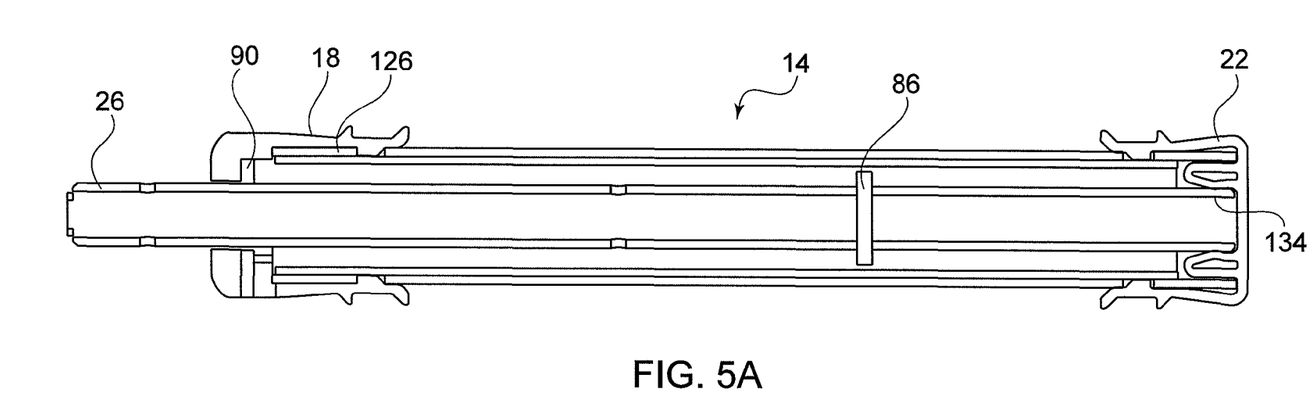
FIG. 5A-B illustrate a longitudinal cross-sectional view of the assembly of FIG. 1.
Figure 5B:
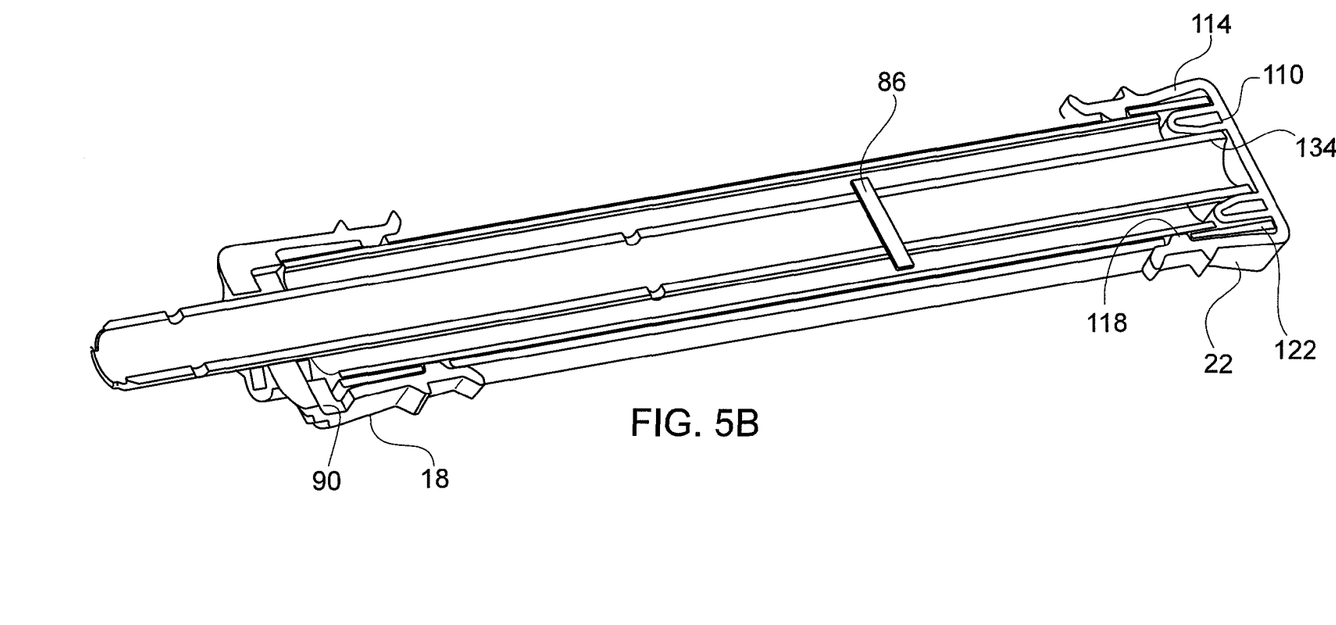

Casing 14 additionally appears, in cross section, in FIGS. 5A-B. Likewise shown in these drawings are cross-sectional representations of end caps 18 and 22 and shaft 26. Included with shaft 26 is pin 86, which freely travels within casing 14 as shaft 26 moves—until shaft 26 is extended fully. When shaft 26 is fully extended, pin 86 is received in internal detent 90 of end cap 18, thus preventing further extension of the shaft 26.

Additionally included as part of end cap 18 are central opening 94 (see FIGS. 7A-B), side recesses 98, and arms 102. Inwardly extending from arms 102 are protrusions 106 designed to snap into openings 50 of side walls 44 and 46, thereby retaining end cap 18 in position relative to outer casing 14. Central opening 94 receives shaft 26 and thus preferably has diameter slightly larger than the diameter of the shaft 26.

Recesses 98 of end cap 18 extend from central opening 94. Such recesses 98 preferably are positioned approximately one hundred eighty degrees apart along the circumference of the central opening 94 but not in the horizontal plane. Instead, recesses 98 advantageously are angled from the horizontal plane.

Recesses 98 are present to accommodate initial insertion of shaft 26 into casing 14. In this initial instance, pin 86 must pass through central opening 94, which would not be possible absent inclusion of recesses 98. After pin 86 passes beyond central opening 94, shaft 26 may be rotated so that pin 86 is generally horizontal, both (1) preventing pin 86 from passing back through central opening 94 and (2) ensuring that pin 86 is engaged by detent 90 when shaft 26 subsequently is fully extended.

Figure 8:
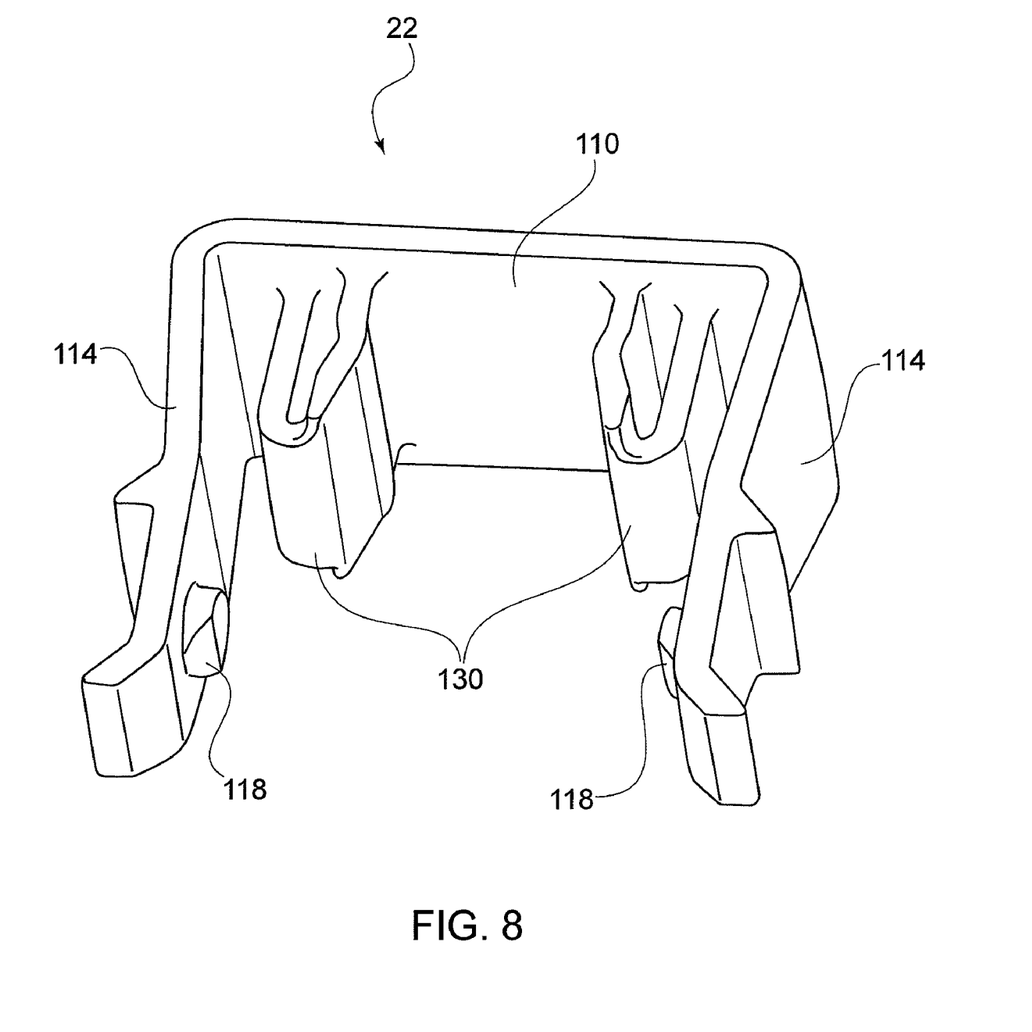
FIG. 8 illustrates a second end cap of the assembly of FIG. 1.

FIG. 8 details end cap 22 of assembly 10. End cap 22 may include base 110 from which arms 114 depend, with arms 114 including inwardly-extending protrusions 118 engaging openings 50 near end 122 of casing 14 opposite end 126 at which cap 18 is positioned. Similarly depending from base 110 are ribs 130; when shaft 26 is fully retracted, its end 134 snaps into and may be retained within the ribs 130. Such retention force applied by ribs 130 thereafter may be overcome by manual force exerted by the user of the associated tray table so that shaft 26 may be extended as needed.

Figure 9:
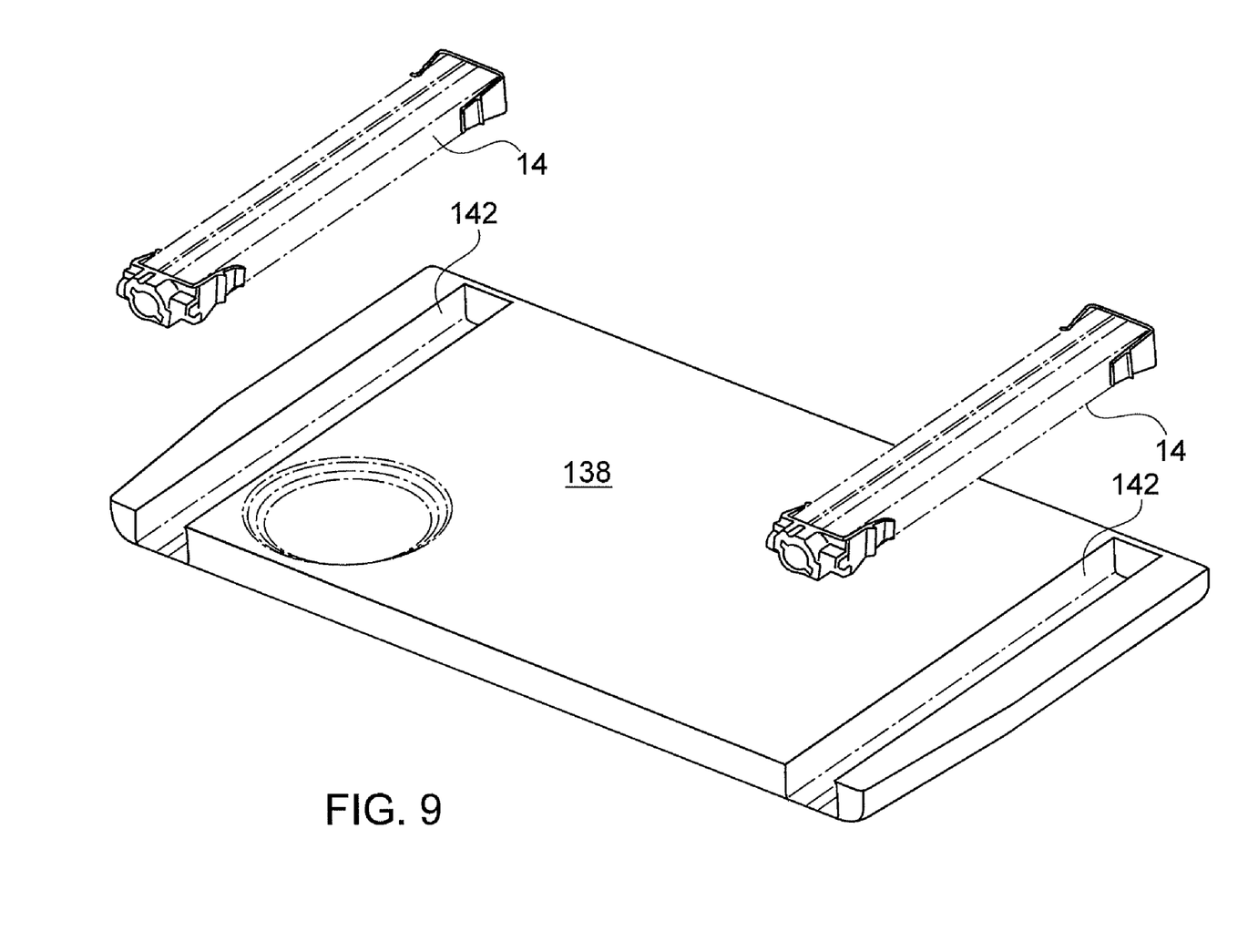
FIG. 9 illustrates assemblies of FIG. 1 (without shafts) for incorporation into a tray table (portions of which have been removed to show interior channels).
Figure 10:
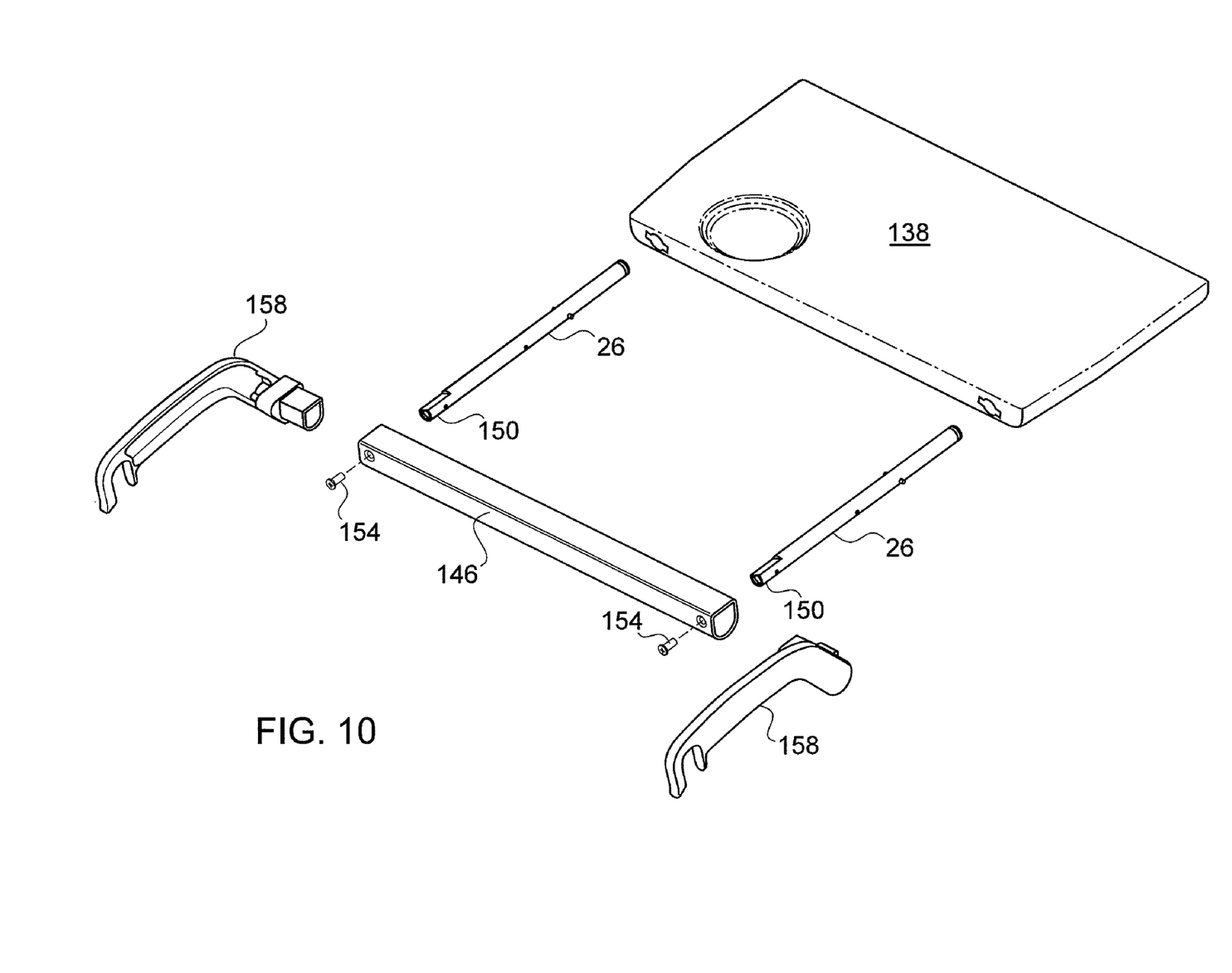
FIGS. 10-11 illustrate the tray table of FIG. 9 together with shafts and ancillary components.
Figure 11:
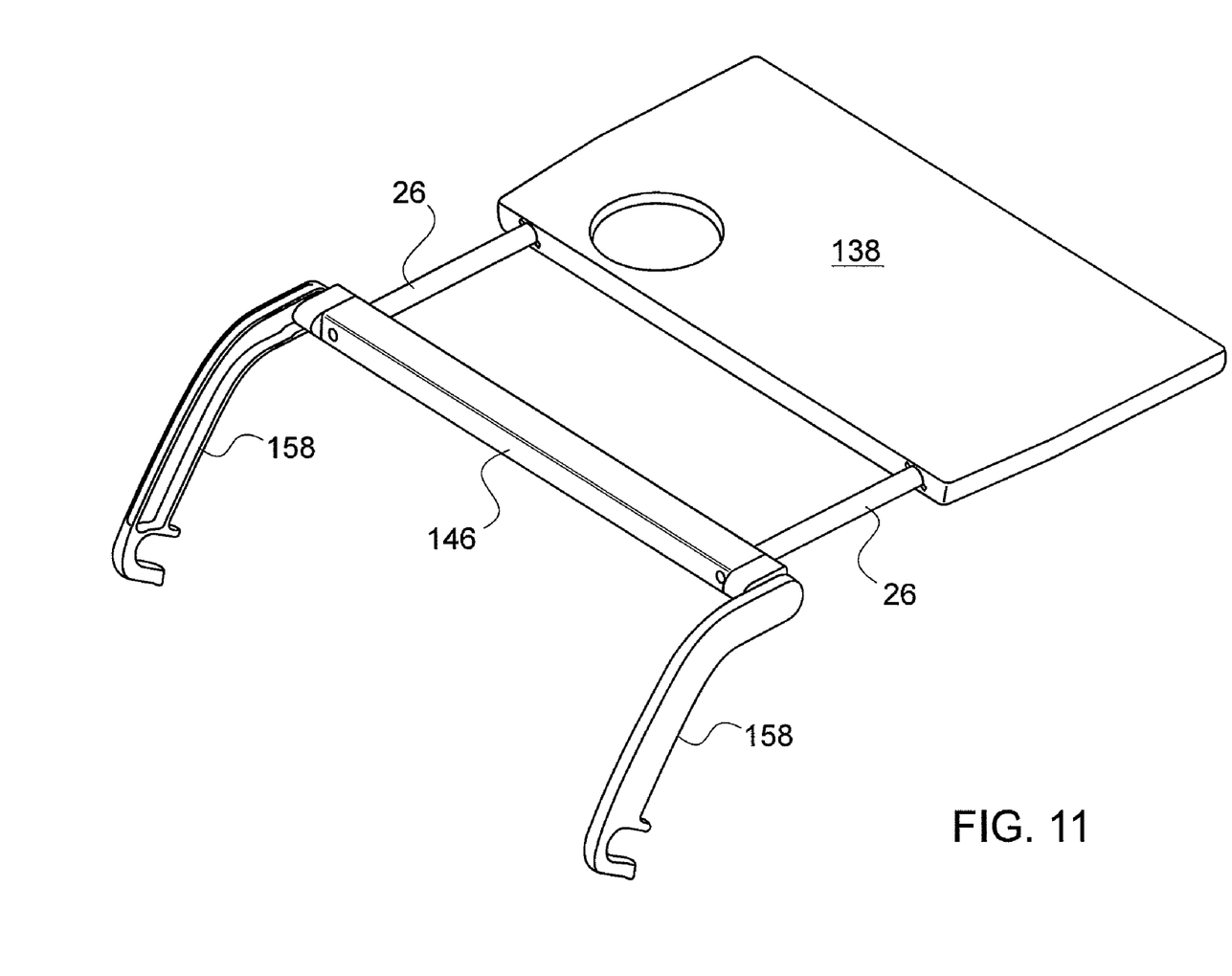

FIGS. 9-11 depict exemplary placements of assemblies 10 within tray table 138. Included within table 138 may be one or more channels 142 into which outer casings 14 may be inserted. Preferably, table 138 surrounds the major surfaces of each outer casing 14 (as in FIG. 10) so as effectively to incorporate the outer casings 14 into the table 138. However, table 138 need not necessarily do so if some other connection scheme is preferred.

As shown in FIGS. 10-11, shafts 26 may be inserted into outer casings 14, with the shafts 26 also being connected to laterally-extending rod 146 at their ends 150. Screws, bolts, or other fasteners or connectors 154 may attach ends 150 to rod 146. Rod 146 additionally may attach to arms 158 conventionally used to connect tray tables to frames of seats.

The foregoing is provided for purposes of illustrating, explaining, and describing embodiments of the present invention. Modifications and adaptations to these embodiments will be apparent to those skilled in the art and may be made without departing from the scope or spirit of the invention. The disclosures of the Bentley, Brennan, and Kanigowski patents are hereby incorporated herein in their entireties by this reference.

What is claimed is:

1. A table assembly comprising:
  a. an outer casing (i) having a first width and (ii) comprising means for receiving a shaft whose width is substantially less than the first width;
  b. a first flexible sleeve configured to have at least a portion thereof positioned within the outer casing so as to bear against the shaft when the shaft is received by the outer casing;
  c. a second flexible sleeve configured to have at least a portion thereof positioned within the outer casing so as to bear against the shaft when the shaft is received by the outer casing, wherein the shaft has a length and the first and second flexible sleeves are configured for placement at the same location along the length of the shaft to place approximately constant laterally-opposed pressure on the shaft when they bear against it; and
  d. a tray table to which the outer casing is connected.

2. A table assembly according to claim 1 in which the first flexible sleeve comprises a base and a plurality of legs depending therefrom.

3. A table assembly according to claim 2 in which the plurality of legs flare outward from the base.

4. A table assembly according to claim 3 in which the outer casing further comprises a first side wall having an interior surface in contact with the base.

5. A table assembly according to claim 1 in which the placement of approximately constant laterally-opposed pressure on the shaft is achieved only by cooperative placement of the first and second sleeves at the same location along the length of the shaft.

6. A table assembly comprising:
  a. an outer casing comprising means for receiving a shaft;
  b. a first flexible sleeve (i) configured to have at least a portion thereof positioned within the outer casing so as to bear against the shaft when the shaft is received by the outer casing and (ii) comprising a base and a plurality of legs depending therefrom;
  c. a second flexible sleeve (i) configured to have at least a portion thereof positioned within the outer casing so as to bear against the shaft when the shaft is received by the outer casing and, together with the first flexible sleeve, place approximately constant laterally-opposed pressure on the shaft when they bear against it and (ii) comprising a base and a plurality of legs depending therefrom; and
  d. a tray table to which the outer casing is connected; and in which the outer casing further comprises a first side wall having an interior surface in contact with the base of the first flexible sleeve and a second side wall (i) parallel to the first side wall and (ii) having an interior surface in contact with the base of the second flexible sleeve.

7. A table assembly according to claim 6 in which each of the first and second flexible sleeves has a cross-sectional shape resembling the Greek letter "pi."

8. A table assembly according to claim 6 in which the outer casing further comprises a top wall, a bottom wall, and centrally-located, inwardly-extending longitudinal protrusions incorporated into the top and bottom walls.

9. A table assembly according to claim 8 in which longitudinally-extending ribs also are incorporated into the top and bottom walls, with (a) the first side wall and at least one of the ribs defining a first recess into which the base of the first flexible sleeve is fitted and (b) the second side wall and at least one of the ribs defining a second recess into which the base of the second flexible sleeve is fitted.

10. A table assembly according to claim 9 further comprising the shaft having a cylindrical shape and in which (a) each of the first and second flexible sleeves has two legs depending from its base and (b) each kg bears against the circumference of the shaft at about ninety degrees from an adjacent leg.

11. A table assembly according to claim 10 further comprising a first end cap:
  a. connected to the outer casing; and
  b. comprising an internal detent; and
in which the shaft includes a pin received in the internal detent when the shaft is at a first position relative to the outer casing.

12. A table assembly according to claim 11 in which the first side wall includes at least one opening and the first end cap further comprises at least one protrusion fitted into the opening.

13. A table assembly according to claim 12 further comprising a second end cap:
  a. connected to the outer casing; and
  b. comprising a base and a plurality of ribs depending therefrom; and
in which the shaft includes an end received by the ribs when the shaft is at a second position relative to the outer casing.

14. A table assembly according to claim 13 in which the outer casing has a length and the shaft-receiving means comprises an opening extending the length of the outer casing.

15. A table assembly according to claim 14 in which the outer casing is embedded within the tray table.

16. An aircraft passenger seat comprising a tray assembly comprising:
  a. a shaft having a width;
  b. a table assembly according to claim 1
  and
  c. a seat frame to which the table assembly is attached.

* * * * *